United States Patent
Yang et al.

(10) Patent No.: US 12,491,285 B2
(45) Date of Patent: Dec. 9, 2025

(54) HEMOSTATIC AGENT FOR JAW CENTRAL HEMANGIOMA HEMORRHAGE AND A PREPARATION METHOD AND APPLICATION THEREOF

(71) Applicant: Nantong University, Nantong (CN)

(72) Inventors: Yumin Yang, Nantong (CN); Jiang Zhu, Nantong (CN); Yongjun Wang, Nantong (CN); Luzhong Zhang, Nantong (CN); Guicai Li, Nantong (CN); Yahong Zhao, Nantong (CN); Jue Ling, Nantong (CN); Pengxiang Yang, Nantong (CN)

(73) Assignee: Nantong University, Nantong (CN)

( * ) Notice: Subject to any disclaimer, the term of this patent is extended or adjusted under 35 U.S.C. 154(b) by 713 days.

(21) Appl. No.: 18/008,440

(22) PCT Filed: Jan. 7, 2021

(86) PCT No.: PCT/CN2021/070644
§ 371 (c)(1),
(2) Date: Apr. 18, 2023

(87) PCT Pub. No.: WO2021/159892
PCT Pub. Date: Aug. 19, 2021

(65) Prior Publication Data
US 2024/0261463 A1    Aug. 8, 2024

(30) Foreign Application Priority Data

Feb. 11, 2020   (CN) .................. 202010086167.X

(51) Int. Cl.
*A61L 24/08*    (2006.01)

(52) U.S. Cl.
CPC ........... *A61L 24/08* (2013.01); *A61L 2400/04* (2013.01)

(58) Field of Classification Search
CPC .................. A61L 24/08; A61L 2400/04
See application file for complete search history.

(56) References Cited

FOREIGN PATENT DOCUMENTS

| CN | 101927027 A | 12/2010 |
| CN | 104436278 A | 3/2015 |
| CN | 111096975 A | 5/2020 |

OTHER PUBLICATIONS

Kuen Yong Lee * , Wan Shik Ha* and Won Ho Park, Blood compatibility and biodegradability of partially N-acylated chitosan derivatives, "Biomaterials", vol. 16, No. 16, pp. 1211-1216, 19951231.
Huang Fang, Diagnosis and treatment of central hemangioma of jaw, "Journal of Basic Medical College of Shandong Medical University", vol. 14, No. 1, pp. 34-37, 20000228.

*Primary Examiner* — Shirley V Gembeh

(57) ABSTRACT

The invention relates to the field of biomedical engineering, and discloses a hemostatic agent for jaw central hemangioma hemorrhage and a preparation method and application thereof. The invention is as follows: chitosan powder and organic weak acid are added into organic alcohol to react, so as to prepare chitosan weak acid salt, and then the chitosan weak acid salt is mixed with carboxymethyl chitosan in proportion to obtain the hemostatic agent of the invention. The hemostatic agent of the invention has good fluidity and plasticity. When applied to the hemostasis of jaw central hemangioma hemorrhage, the hemostatic agent of the invention can quickly reach the point of jaw central hemangioma hemorrhage without any stimulation and damage to the tissue. In addition, the hemostatic agent of the invention can inhibit the growth of bacteria, eliminate cross infection, and is easy to clean and remove. Therefore, the hemostatic agent of the invention can safely and effectively treat the massive hemorrhage of jaw central hemangioma, which is worthy of clinical promotion. At the same time, the hemostatic agent of the invention can also be used for hemostasis of hemorrhage points in tissue cavities with special structures.

4 Claims, No Drawings

HEMOSTATIC AGENT FOR JAW CENTRAL HEMANGIOMA HEMORRHAGE AND A PREPARATION METHOD AND APPLICATION THEREOF

TECHNICAL FIELD

The invention relates to the field of biomedical engineering, and discloses a hemostatic agent for jaw central hemangioma hemorrhage and a preparation method and application thereof.

BACKGROUND ART

Jaw central hemangioma is true hemangioma, which is rare and latent in clinic, but it is a potentially dangerous disease, and it is rarely diagnosed before symptoms. Jaw central hemangioma is common in children and adolescents. Patients often have massive hemorrhage during routine tooth extraction in the clinic, so the death is not rare. Fatal massive hemorrhage will be caused if not knowing the patient's situation and rashly performing surgery or extracting the teeth in the affected area. Therefore, the timely and effective hemostasis for patients at the first scene is very important for rescuing patients and further diagnosis, as well as formulating a reasonable treatment plan and curing patients.

Because the jaw central hemangioma often has sudden serious hemorrhage, especially in tooth extraction, the alveolar fossa will swell and bleed. The main method of treatment is to press the alveolar fossa with fingers for compression hemostasis, fill the alveolar fossa with bone wax and iodoform gauze as soon as possible, press for mattress suture, and take comprehensive measures such as blood transfusion and rehydration when necessary. In addition to local hemostasis, the patient should be transferred to the ward for monitoring in time, and treated with blood transfusion, rehydration and ant-shock, so as to stabilize the condition and win time for further treatment of the primary disease. When the local hemostasis is difficult to work, the patient must be operated and ligated by external carotid artery to stop hemorrhage. However, surgical treatment inevitably needs to remove most of the jaw and teeth, and even can not maintain the continuity of the jaw, resulting in local depression deformity and dysfunction after operation, which seriously affects the quality of life of patients. It has been reported that the ligation of external carotid artery to stop hemorrhage not only resulted in ineffective operation, but also promoted the opening of abnormal collateral circulation. In addition, after the external carotid artery ligation, intravascular embolization is difficult to implement, which increases the difficulty of the next step of treatment. At present, embolization therapy is used in clinic, which opens up a new way for emergency hemostasis. This method adopts arterial retrograde intubation and carries out the embolization with its own muscles or various microspheres. However, because the cannula cannot enter the blood supply artery, this method can not effectively embolize, but may wrongly embolize important blood vessels and cause serious complications, which limits its clinical use.

The two main reasons why it is difficult to stop hemorrhage in the central blood vessel of the jaw are as follows: 1. the hemorrhage point of the jaw central blood vessel is often hidden in the alveolar fossa, and the spatial structure is small and irregular. The existing hemostatic materials can not reach the hemorrhage point quickly; and 2. after tooth extraction, the jaw central blood vessel hemorrhage often sprays. Therefore, in order to stop the hemorrhage of the jaw central blood vessel, the hemostatic material must first be able to quickly reach the hemorrhage point. At the same time, it is necessary not only to stop the hemorrhage, but also to form a certain pressure at the hemorrhage point, so as to effectively stop the hemorrhage of the jaw central blood vessel. Therefore, it is an urgent need to find a hemostatic agent for hemorrhage points in special structural tissue cavities, especially for the safe and effective treatment of massive hemorrhage of jaw central hemangioma.

Content of Invention

The invention aims to provide a hemostatic agent for jaw central hemangioma hemorrhage and a preparation method and application thereof. The hemostatic agent of the invention has good fluidity and plasticity. When applied to the hemostasis of jaw central hemangioma hemorrhage, the hemostatic agent of the invention can quickly reach the point of jaw central hemangioma hemorrhage without any stimulatation and damage to the tissue. In addition, the hemostatic agent of the invention can inhibit the growth of bacteria, eliminate cross infection, and is easy to clean and remove.

In order to solve the technical problem above, the invention provides a preparation method for hemostatic agent for jaw central hemangioma hemorrhage, which comprises the following steps:
1) Add chitosan powder and organic weak acid into organic alcohol, react at 40 to 50° C. for 3 to 5 h, filter the filtrate, wash with organic alcohol, and dry at 40 to 50° C. to obtain chitosan weak acid salt;
2) Evenly mix the chitosan weak acid salt and carboxymethyl chitosan to obtain a hemostatic agent. The content of carboxymethyl chitosan in the hemostatic agent is 8 to 17 wt %.

Preferably, the organic alcohol is one or two of ethanol and isopropanol.

Preferably, the organic weak acid is one or two of citric acid and lactic acid.

Preferably, the deacetylation degree of the chitosan powder is 75 to 99%, the molecular weight is 10 to 500 KDa, and the viscosity is 30 to 100 cP.

Preferably, the dosage ratio of the organic alcohol, chitosan powder and organic weak acid in step 1) is 100 ml:(10 to 20) g:(5 to 12) g.

The invention also provides a hemostatic agent prepared according to the preparation method above.

The invention also provides the application of the hemostatic agent above in the hemostasis of jaw central hemangioma hemorrhage.

The hemostatic agent of the invention has good fluidity and plasticity, and can quickly reach the hemorrhage points in tissue cavities with special structures, such as the hemorrhage point of jaw central hemangioma, by removing air, and then hemostasis is realized quickly by tightly pressing with medical gauze for 3 to 5 minutes. In addition, the hemostatic agent has no stimulation and damage to the tissue, and can inhibit the growth of bacteria, eliminate cross infection, and is easy to clean and remove. Therefore, the hemostatic agent of the invention can safely and effectively treat the hemorrhage of jaw central hemangioma. The hemostatic agent of the invention can avoid the growth and development disorder of jaw and teeth and facial deformity caused by operation, maintain the maxillofacial shape and chewing function of patients to the greatest extent, and ensure the quality of life of patients, which is worthy of clinical promotion.

EMBODIMENTS

The following describes the preferred embodiments of the invention for further understanding of the invention, but it should be understood that these descriptions are only for further explaining the features and advantages of the invention, rather than limiting the claims of the invention.

The sources of all raw materials of the invention are not particularly limited and can be purchased on the market or prepared according to the conventional methods well known to those skilled in the art.

The invention provides a preparation method of chitosan based rapid hemostatic agent, which comprises the following steps:

1) Add chitosan powder and organic weak acid into organic alcohol, react at 40 to 50° C. for 3 to 5 h, filter the filtrate, wash with organic alcohol, and dry at 40 to 50° C. to obtain chitosan weak acid salt;
2) Evenly mix the chitosan weak acid salt and carboxymethyl chitosan to obtain a hemostatic agent. The content of carboxymethyl chitosan in the hemostatic agent is 8 to 17 wt %.

Specifically, the steps of the invention are as follows: first, successively add chitosan powder and organic weak acid into the organic alcohol, react at 40 to 50° C. for 3 to 5 h, filter the filtrate and wash with organic alcohol, and dry at 40 to 50° C. to obtain chitosan weak acid salt. In the invention, the organic alcohol used is preferably one or two of ethanol and isopropanol with commercial concentration. The organic weak acid used is preferably one or two of citric acid and lactic acid of commercial concentration. The deacetylation degree of the chitosan powder used is preferably 75 to 99%, the molecular weight is 10 to 500 kda, the viscosity is 30 to 100 cP and the mesh number is 50. In the invention, the preferred dosage ratio of the organic alcohol, chitosan powder and organic weak acid is 100 ml:10 to 20 g:5 to 12 g.

The obtained chitosan weak acid salt is evenly mixed with carboxymethyl chitosan to obtain the hemostatic agent. The content of carboxymethyl chitosan in the hemostatic agent is 8 to 17 wt %, and more preferably, it is 8 to 14 wt %.

The invention also provides a hemostatic agent prepared by the above preparation method. The hemostatic agent is a granular hemostatic agent based on chitosan powder, which not only retains the hemostatic advantages of the original chitosan, but also has good fluidity and plasticity. The granular hemostatic agent provided by the invention has a porous structure and thus has a molecular sieve function. Such structure is beneficial to quickly absorb the wound liquid, and gather the tangible components such as blood platelet and red blood cells on the granule surface. In addition, such structure also promotes the attachment of thrombin, albumin and fibrin. Within a few seconds, a gel like mixture can be formed locally, thereby forming a solid and reliable coagulation block so as to achieve the fast hemostasis effect. At the same time, the carboxymethyl chitosan contained in the hemostatic agent of the invention plays a bonding role, bonding the chitosan granules into hard blocks in the cavity where the hemorrhage point is located, forming pressure to resist the hemorrhage point, so as to achieve more effective hemostasis.

The invention also provides the application of the hemostatic agent in hemostasis of jaw central hemangioma hemorrhage.

In order to further describe the invention, the preparation method of the hemostatic agent for jaw central hemangioma hemorrhage of the invention is described in detail below in combination with the embodiments.

Embodiment 1

(1) Add 10 g chitosan powder (deacetylation degree: 80%, molecular weight: 300 kDa, viscosity: 60 cP, mesh: 50) into 100 ml ethanol, then add 5 g citric acid, react at 40° C. for 5 h, filter and obtain the precipitate.

(2) Wash the precipitate twice with ethanol and dry at 40° C. to obtain 12 g chitosan citrate.

(3) Evenly mix 12 g chitosan citrate and 1 g carboxymethyl chitosa to obtain the hemostatic agent of this embodiment.

Embodiment 2

(1) Add 15 g chitosan powder (deacetylation degree: 80%, molecular weight: 300 kDa, viscosity: 60 cP, mesh: 50) into 100 ml isopropanol, then add 8 g lactic acid, react at 40° C. for 4 h, filter and obtain the precipitate.

(2) Wash the precipitate twice with isopropanol and dry at 40° C. to obtain 18 g chitosan lactate.

(3) Evenly mix 18 g chitosan lactate and 2 g carboxymethyl chitosa to obtain the hemostatic agent of this embodiment.

Embodiment 3

(1) Add 20 g chitosan powder (deacetylation degree: 80%, molecular weight: 300 kDa, viscosity: 60 cP, mesh: 50) into 100 ml isopropanol, then add 12 g lactic acid, react at 50° C. for 3 h, filter and obtain the precipitate.

(2) Wash the precipitate twice with isopropanol and dry at 40° C. to obtain 24 g chitosan lactate.

(3) Evenly mix 24 g chitosan lactate and 3.5 g carboxymethyl chitosa to obtain the hemostatic agent of this embodiment.

Test Cases

The hemostatic agent for jaw central hemangioma hemorrhage, which is provided by the embodiments 1 to 3 of the invention, is used for test:

Appearance property test: the hemostatic agent for jaw central hemangioma hemorrhage, which is provided by the embodiments 1 to 3 of the invention, has uniform granules, good fluidity and no irritation, and its pH value of aqueous solution is 6 to 7.

Hemostatic effect test: it is measured by in vitro rabbit blood coagulation time, the hemostatic time of arterial hemostasis time of rabbit and the hemostatic time of hemostatic time of dog femoral artery. Especially the environment and hemorrhage condition at the hemorrhage point in the dog femoral artery hemorrhage are similar to those at the hemorrhage point of jaw central blood vessel, thus, it is a good measurement index.

Bacteriostatic rate test: the bacteriostatic rate of the hemostatic agent for jaw central hemangioma hemorrhage, which is provided by the embodiments 1 to 3 of the invention, is as high as 100%.

The test results are shown in Table 1.

TABLE 1

Test results of hemostatic agent provided in embodiments 1 to 3

| Sample | Embodiment 1 | Embodiment 2 | Embodiment 3 |
|---|---|---|---|
| Irritation | None | None | None |
| In vitro rabbit blood coagulation time | 40 s | 38 s | 35 s |
| Arterial hemostasis time of rabbit | 2 min | 2 min | 2 min |
| Hemostatic time of dog femoral artery | 2 min | 2 min | 3 min |
| Bacteriostatic rate | 100% | 100% | 100% |

Table 1 shows that the hemostatic agent for jaw central hemangioma hemorrhage provided by the invention is not irritant and can achieve good hemostatic effect within a short time. In addition, it also has good bacteriostatic effect.

The above content describes the basic principles and main characteristics and the advantages of the invention. Obviously, the invention is not limited to the details of the above exemplary embodiments. Those skilled in the art can realize the invention in other specific forms without departing from the spirit or basic characteristics of the invention. Therefore, from any point of view, the embodiments should be regarded as exemplary and non-limiting. The scope of the invention is limited by the appended claims rather than the above description. Therefore, all changes falling within the meaning and scope of the equivalent conditions of the claims are included in the invention. Although the embodiments of the invention have been shown and described, those skilled in the art can make a variety of changes, modifications, substitutions and modifications to these embodiments without departing from the principle and spirit of the invention. The scope of protection of the invention is defined by the appended claims and their equivalents.

The invention claimed is:

1. A preparation method for hemostatic agent for jaw central hemangioma hemorrhage, characterized comprising the following steps:
   1) Adding chitosan powder and organic weak acid into organic alcohol, reacting at a temperature of 40 to 50° C. for 3 to 5 h, filtering the filtrate, washing with organic alcohol, and drying at a temperature of 40 to 50° C. so as to obtain chitosan weak acid salt, wherein the organic alcohol is one or two of ethanol and isopropanol, the organic weak acid is one or two of citric acid and lactic acid, wherein a usage of the organic alcohol: the chitosan powder: the organic weak acid is 100 ml:(10 to 20) g:(5 to 12) g;
   2) Evenly mixing the chitosan weak acid salt and carboxymethyl chitosan to obtain a hemostatic agent, the content of carboxymethyl chitosan in the hemostatic agent is 8 to 17 wt %.

2. The preparation method according to claim 1, characterized in that the proportion of deacetylation of the chitosan powder is 75 to 99%, the molecular weight is 10 to 500 KDa, and the viscosity is 30 to 100 cP.

3. The hemostatic agent prepared according to the preparation method of any one of claim 1.

4. The application of the hemostatic agent of claim 3 in the hemostasis of jaw central hemangioma hemorrhage.

* * * * *